United States Patent
Lee et al.

(10) Patent No.: US 12,183,896 B2
(45) Date of Patent: Dec. 31, 2024

(54) SOLID ELECTROLYTE MEMBRANE AND ALL-SOLID-STATE BATTERY COMPRISING SAME

(71) Applicant: LG Chem, Ltd., Seoul (KR)

(72) Inventors: Jung-Pil Lee, Daejeon (KR); Eun-Bee Kim, Daejeon (KR); Hyo-Sik Kim, Daejeon (KR); Ji-Hoon Ryu, Daejeon (KR); Seung-He Woo, Daejeon (KR); Suk-Woo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 747 days.

(21) Appl. No.: 17/264,051

(22) PCT Filed: Jan. 10, 2020

(86) PCT No.: PCT/KR2020/000522
§ 371 (c)(1),
(2) Date: Jan. 28, 2021

(87) PCT Pub. No.: WO2020/145749
PCT Pub. Date: Jul. 16, 2020

(65) Prior Publication Data
US 2021/0288354 A1    Sep. 16, 2021

(30) Foreign Application Priority Data

Jan. 10, 2019    (KR) .................. 10-2019-0003387

(51) Int. Cl.
*H01M 10/42*    (2006.01)
*H01M 4/38*    (2006.01)
(Continued)

(52) U.S. Cl.
CPC ....... *H01M 10/4235* (2013.01); *H01M 4/382* (2013.01); *H01M 10/052* (2013.01);
(Continued)

(58) Field of Classification Search
CPC ............ H01M 10/052; H01M 10/056; H01M 10/0565
(Continued)

(56) References Cited

U.S. PATENT DOCUMENTS 6,645,675 B1    11/2003    Munshi
2012/0029099 A1*    2/2012    Hsieh ................ H01M 10/0525
521/30
(Continued)

FOREIGN PATENT DOCUMENTS

CN    105074968 A    11/2015
CN    108886139 A    11/2018
(Continued)

OTHER PUBLICATIONS

Zhao et al., An anion-immobilized composite electrolyte for dendrite-free lithium metal anodes, PNAS, Oct. 2017, 6 pages.
(Continued)

*Primary Examiner* — James M Erwin
*Assistant Examiner* — John S Medley
(74) *Attorney, Agent, or Firm* — Lerner David LLP (57) ABSTRACT

The present disclosure relates to a solid electrolyte membrane for an all-solid-state battery and a battery including the same. The battery may include lithium metal as a negative electrode active material. The solid-electrolyte membrane provides an effect of inhibiting growth of lithium dendrite by ionizing lithium deposited as metal. Therefore, when using lithium metal as a negative electrode in the all-solid-state battery including the solid electrolyte membrane, there is provided an effect of delaying and/or inhibiting growth of lithium dendrite. Thus, it is possible to effectively prevent an electrical short-circuit caused by growth of lithium dendrite.

17 Claims, 2 Drawing Sheets

(51) Int. Cl.
*H01M 10/052* (2010.01)
*H01M 10/056* (2010.01)
*H01M 10/0565* (2010.01)
*H01M 4/02* (2006.01)

(52) U.S. Cl.
CPC ..... *H01M 10/056* (2013.01); *H01M 10/0565* (2013.01); *H01M 2004/027* (2013.01); *H01M 2300/0071* (2013.01); *H01M 2300/0082* (2013.01); *H01M 2300/0085* (2013.01); *H01M 2300/0091* (2013.01)

(58) Field of Classification Search
USPC ............................................................ 429/303
See application file for complete search history.

(56) References Cited

U.S. PATENT DOCUMENTS

| | | | |
|---|---|---|---|
| 2012/0231348 A1* | 9/2012 | Ohtomo | H01M 10/0562 429/318 |
| 2013/0026409 A1 | 1/2013 | Baker et al. | |
| 2014/0017557 A1 | 1/2014 | Lockett et al. | |
| 2014/0072881 A1 | 3/2014 | Park et al. | |
| 2014/0227593 A1* | 8/2014 | Lee | H01M 50/443 429/246 |
| 2015/0295246 A1 | 10/2015 | Son et al. | |
| 2016/0028112 A1 | 1/2016 | Zhong et al. | |
| 2017/0187063 A1 | 6/2017 | Pistorino et al. | |
| 2017/0218138 A1 | 8/2017 | Choi et al. | |
| 2017/0279101 A1 | 9/2017 | Sago et al. | |
| 2017/0324097 A1 | 11/2017 | Lee et al. | |
| 2018/0166743 A1 | 6/2018 | Lee et al. | |
| 2018/0166759 A1 | 6/2018 | Zhamu et al. | |
| 2019/0081346 A1 | 3/2019 | Yun et al. | |
| 2019/0115616 A1 | 4/2019 | Ahn et al. | |
| 2020/0014071 A1 | 1/2020 | Nakashima et al. | |
| 2020/0144666 A1 | 5/2020 | Choi et al. | |
| 2021/0013543 A1* | 1/2021 | Imai | H01M 10/0585 |
| 2024/0047822 A1* | 2/2024 | Evans | H01M 50/497 |

FOREIGN PATENT DOCUMENTS

| | | | | |
|---|---|---|---|---|
| JP | 2003508886 A | | 3/2003 | |
| JP | 2004165050 A | * | 6/2004 | ............... H01B 1/06 |
| JP | 2011119158 A | | 6/2011 | |
| JP | 2017204468 A | | 11/2017 | |
| JP | WO2018186442 A1 | | 11/2019 | |
| JP | 2020113527 A | | 7/2020 | |
| KR | 20140036413 A | | 3/2014 | |
| KR | 20140049528 A | | 4/2014 | |
| KR | 20160054058 A | | 5/2016 | |
| KR | 20170126397 A | | 11/2017 | |
| KR | 20180068115 A | | 6/2018 | |
| KR | 20180076709 A | | 7/2018 | |
| KR | 20180084137 A | | 7/2018 | |
| KR | 20180116145 A | | 10/2018 | |
| WO | 2018183771 A1 | | 10/2018 | |
| WO | WO-2018222379 A2 | * | 12/2018 | ........... H01M 10/052 |

OTHER PUBLICATIONS

International Search Report for Application No. PCT/KR2020/000522, mailed Apr. 21, 2020, pp. 1-2.
Wu, F et al., "Perspectives for restraining harsh lithium dendrite growth: Towards robust lithium metal anodes", "Energy Storage Materials", Apr. 2018, pp. 148-170, vol. 15, Elsevier.
Extended European Search Report for EP Application No. 20738069 dated Oct. 29, 2021, 2 pgs.

* cited by examiner

SOLID ELECTROLYTE MEMBRANE AND ALL-SOLID-STATE BATTERY COMPRISING SAME

CROSS-REFERENCE TO RELATED APPLICATION

This application is a national phase entry under 35 U.S.C. § 371 of International Application No. PCT/KR2020/000522 filed Jan. 10, 2020, which claims priority from Korean Patent Application No. 10-2019-0003387 filed Jan. 10, 2019, all of which are incorporated herein by reference.

TECHNICAL FIELD

The present disclosure relates to a solid electrolyte membrane for an all-solid-state battery and a battery including the same. The present disclosure also relates to an all-solid-state battery including lithium metal as a negative electrode active material.

BACKGROUND ART

A lithium ion battery using a liquid electrolyte has a structure in which a negative electrode and positive electrode are defined by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte is advantageous in that it has enhanced safety, prevents leakage of an electrolyte to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

The solid electrolyte may include a polymeric material made of an ion conductive material, or an inorganic material such as ion conductive oxide or sulfide. In addition, hybrid-type materials including a polymeric material mixed with an inorganic material has been suggested.

Figure 1:
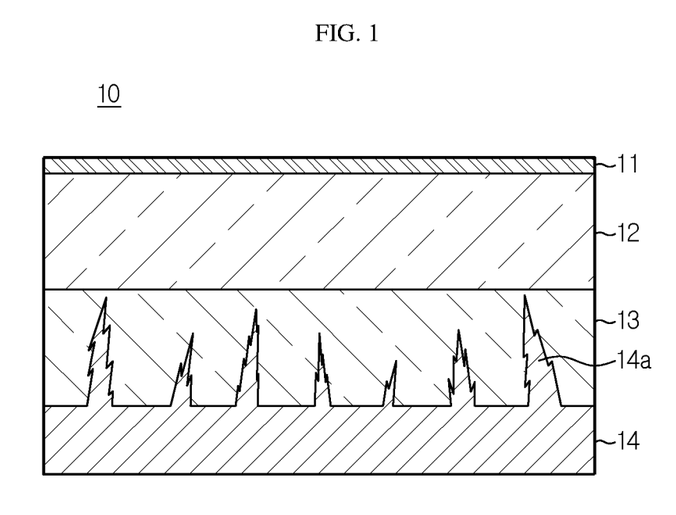
FIG. 1 is a schematic view illustrating the problem of a short-circuit caused by growth of lithium dendrite from the negative electrode in the conventional all-solid-state battery.

Meanwhile, when lithium metal is used as a negative electrode active material, there is a problem in that lithium dendrite is grown from the negative electrode surface and the grown lithium dendrite causes a short-circuit in a battery when it is in contact with a positive electrode. In an all-solid-state battery, a solid electrolyte membrane functions as an electrical insulator between a positive electrode and a negative electrode, instead of a separator. However, when a polymeric material is used as a solid electrolyte, the solid electrolyte membrane may be damaged due to the growth of lithium dendrite. FIG. 1 shows a conventional all-solid-state battery 10 using a solid electrolyte and schematically illustrates a mechanism of short-circuit generation caused by the growth of lithium dendrite. Referring to FIG. 1, the solid electrolyte membrane 13 is damaged by lithium dendrite 14a grown at the negative electrode 14. Meanwhile, a solid electrolyte membrane using an oxide- or sulfide-based inorganic solid electrolyte is generally formed by integrating particle-type ion conductive inorganic materials into a layered structure, and thus includes a plurality of pores due to the interstitial volumes among the particles. Therefore, lithium dendrite may be grown in the spaces provided by the pores and lithium dendrite grown through the pores may be in contact with the positive electrode 12, resulting in a short-circuit. Under these circumstances, there is a need for developing an electrolyte membrane for an all-solid-state battery which can inhibit growth of lithium dendrite.

DISCLOSURE

Technical Problem

The present disclosure is designed to solve the problems of the related art, and therefore the present disclosure is directed to providing a solid electrolyte membrane for an all-solid-state battery which inhibits growth of lithium dendrite. The present disclosure is also directed to providing an all-solid-state battery including lithium metal as a negative electrode active material. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a solid electrolyte membrane for an all-solid-state battery. According to the first embodiment of the present disclosure, there is provided a solid electrolyte membrane for an all-solid-state battery which is interposed between a negative electrode and a positive electrode, and includes a) a polymeric electrolyte material having ion conductivity, b) a dendrite growth-inhibiting material, and c) a plurality of filler particles, wherein the growth-inhibiting material is a metal salt and/or metal ion and is mixed with the polymeric electrolyte, the metal salt and/or metal ion has lower reactivity as compared to lithium metal, and the filler particles are chemically and physically stable against electrochemical reaction and includes organic particles and/or inorganic particles.

According to the second embodiment of the present disclosure, there is provided the solid electrolyte membrane for an all-solid-state battery as defined in the first embodiment, wherein the polymeric electrolyte material is present in an amount of 10-95 wt % based on 100 wt % of the solid electrolyte membrane.

According to the third embodiment of the present disclosure, there is provided the solid electrolyte membrane for an all-solid-state battery as defined in the first or the second embodiment, wherein the metal salt or metal ion is a metal salt including any one of K, Sr, Ca, Na, Mg, Be, Al, Mn, Zn, Cr(+3), Fe, Cd, Co, Ni, Sn, Pb, Cu, Hg, Ag, Pd, Ir, Pt(+2), Au and Pt(+4), or a metal ion thereof.

According to the fourth embodiment of the present disclosure, there is provided the solid electrolyte membrane for an all-solid-state battery as defined in any one of the first to the third embodiments, wherein the polymeric electrolyte is an ion conductive composite of polymer resin with lithium salt and has an ion conductivity of $1 \times 10^{-6}$ S/m or more.

According to the fifth embodiment of the present disclosure, there is provided the solid electrolyte membrane for an all-solid-state battery as defined in any one of the first to the fourth embodiments, wherein the inorganic particle includes at least one of metal oxides and oxide-based solid electrolytes.

According to the sixth embodiment of the present disclosure, there is provided the solid electrolyte membrane for an all-solid-state battery as defined in any one of the first to the fifth embodiments, wherein the inorganic particles have a particle diameter of 10 nm to 50 μm.

According to the seventh embodiment of the present disclosure, there is provided the solid electrolyte membrane for an all-solid-state battery as defined in any one of the first to the sixth embodiments, wherein the metal oxide includes at least one selected from $BaTiO_3$, $Pb(Zr,Ti)O_3(PZT)$, $Pb_{1-x}La_xZr_{1-y}Ti_yO_3(PLZT$, wherein $0<x<1$, $0<y<1)$, $Pb(Mg_{1/3}Nb_{2/3})O_3$—$PbTiO_3(PMN$-$PT)$, hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ and SiC.

According to the eighth embodiment of the present disclosure, there is provided the solid electrolyte membrane for an all-solid-state battery as defined in any one of the first to the seventh embodiments, wherein the oxide-based solid electrolyte includes at least one selected from lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_y$-$P_zS_w$, $0<x<4$, $0<y<1$, $0<z<1$, $0<w<5$), such as such as $Li_{3.25}Ge_{0.25}P_{0.75}S_4$, lithium nitride ($Li_xN_y$, $0<x<4$, $0<y<2$), such as $Li_3N$, $SiS_2$-type glass ($Li_xSi_yS_z$, $0<x<3$, $0<y<2$, $0<z<4$), such as $Li_3PO_4$—$Li_2S$—$SiS_2$, $P_2S_5$-type glass ($Li_xP_yS_z$, $0<x<3$, $0<y<3$, $0<z<7$), such as LiI—$Li_2S$—$P_2S_5$ and mixtures thereof.

According to the ninth embodiment of the present disclosure, there is provided the solid electrolyte membrane for an all-solid-state battery as defined in any one of the first to the eighth embodiments, wherein the organic particle includes any one selected the group consisting of styrene-butadiene rubber (SBR), polybutadiene rubber, polychloroprene (neoprene), nitrile rubber, acryl rubber, fluoro-rubber (FKM), polyvinyl chloride (PVC), polystyrene, polymethyl methacrylate (PMMA), acrylonitrile-butadiene-styrene (ABS), polyvinylidene fluoride, polyvinyl fluoride, PTFE, polyvinyl acetate, polyvinyl acetate-containing copolymers and polyvinyl acetate-co-ethylene, or a mixture of two or more of them.

According to the tenth embodiment of the present disclosure, there is provided an all-solid-state battery including the solid electrolyte membrane as defined in any one of the first to the ninth embodiments, and having a negative electrode, the solid electrolyte membrane and a positive electrode stacked successively, wherein the negative electrode includes lithium metal as a negative electrode active material.

Advantageous Effects

The solid-electrolyte membrane according to the present disclosure includes, as an inhibiting material contained in the solid electrolyte membrane, a metal salt or metal ion having higher reducibility as compared to lithium, and thus deposited lithium metal is ionized again to provide an effect for inhibiting growth of lithium dendrite. Particularly, the solid electrolyte is designed in such a manner that a particle-type material is added into the solid electrolyte layer so that the inhibiting material may be positioned at the site where lithium dendrite is grown and may react with ease. Therefore, when using lithium metal as a negative electrode in the all-solid-state battery including the solid electrolyte membrane, there is provided an effect of delaying and/or inhibiting growth of lithium dendrite. Thus, it is possible to effectively prevent an electrical short-circuit caused by growth of lithium dendrite.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part ⌈includes⌉ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to an electrolyte membrane for a secondary battery and a secondary battery including the same. According to the present disclosure, the secondary battery may be a lithium ion secondary battery. According to an embodiment of the present disclosure, the secondary battery may be an all-solid-state battery using a solid electrolyte and the battery may include lithium metal as a negative electrode active material.

Figure 2:
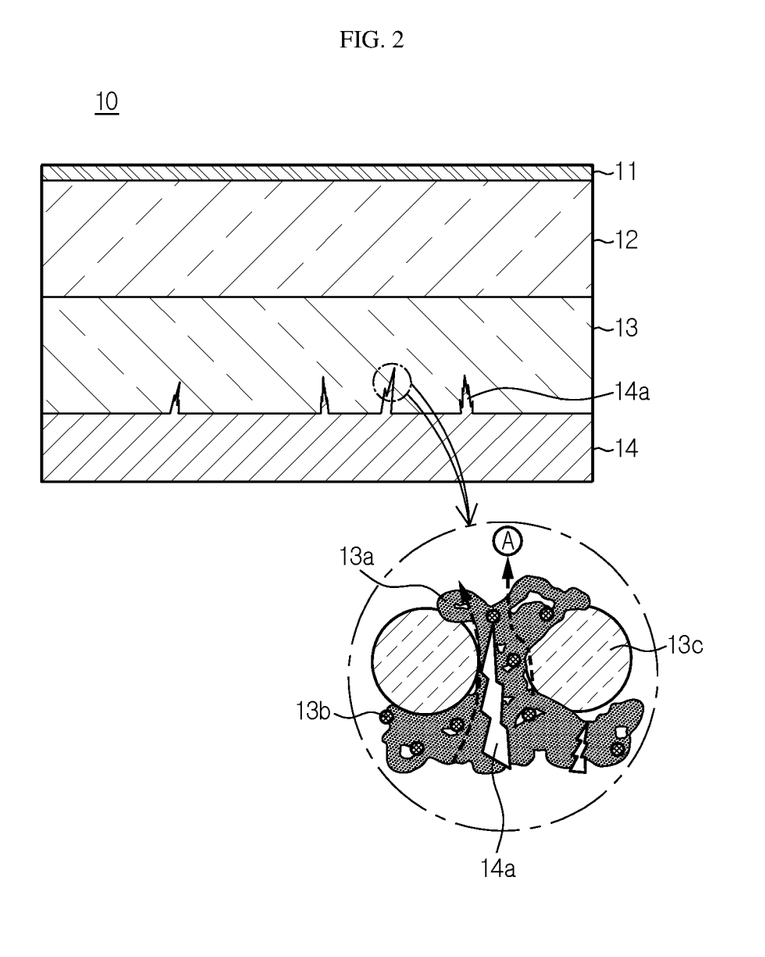
FIG. 2 is a schematic view illustrating the all-solid-state battery according to an embodiment of the present disclosure, wherein the direction of growth of lithium dendrite is guided by the filler particles contained in the solid electrolyte membrane and growth of lithium dendrite is inhibited by the growth-inhibiting material.

FIG. 2 is a schematic view illustrating the secondary battery 10 according to an embodiment of the present disclosure, and the secondary battery 10 includes the solid electrolyte membrane 13 between the positive electrode 12 and the negative electrode 14. Hereinafter, the present disclosure will be explained in more detail with reference to FIG. 2.

(1) Solid Electrolyte Membrane

The solid electrolyte membrane according to the present disclosure uses a polymeric material and/or inorganic material having ion conductivity. For example, the solid electrolyte membrane may be applied as an ion conductive electrolyte for an all-solid-state battery using no liquid electrolyte.

The solid electrolyte membrane includes (a) a polymeric electrolyte material, (b) a dendrite growth-inhibiting material, and (c) a plurality of filler particles.

According to an embodiment of the present disclosure, the polymeric electrolyte material may be a solid polymeric electrolyte formed by adding a polymer resin to a solvated lithium salt, or a polymer gel electrolyte prepared by impregnating a polymer resin with an organic electrolyte containing an organic solvent and a lithium salt.

For example, the polymeric electrolyte material may include, as a polymer resin, any one selected from the group consisting of a polyether polymer, polycarbonate polymer, acrylate polymer, polysiloxane polymer, phosphazene polymer, polyethylene derivatives, alkylene oxide derivatives, phosphate polymer, polyagitation lysine, polyester sulfide, polyvinyl alcohol, polyvinylidene fluoride and a polymer containing an ionically dissociable group, or a mixture of two or more of them. However, the scope of the present disclosure is not limited thereto.

According to an embodiment of the present disclosure, the polymeric electrolyte material may include, as a polymer resin, any one selected from the group consisting of a branched copolymer including polyethylene oxide (PEO) backbone copolymerized with a comonomer including an amorphous polymer, such as PMMA, polycarbonate, polydiloxane (pdms) and/or phosphazene, comb-like polymer and a crosslinked polymer resin, or a mixture of two or more of them.

According to an embodiment of the present disclosure, the polymer gel electrolyte includes a lithium salt-containing organic electrolyte and a polymer resin, wherein the organic electrolyte is used in an amount of 60-400 parts by weight based on the weight of the polymer resin. There is no particular limitation in the polymer used for the gel electrolyte, and particular examples of the polymer include any one selected from the group consisting of polyvinyl chloride (PVC) polymers, poly(methyl methacrylate) (PMMA) polymers, polyacrylonitrile (PAN), polyvinylidene fluoride (PVdF) and poly(vinylidene fluoride-co-hexafluoropropylene: PVdF-HFP), or a mixture of two or more of them. However, the scope of the present disclosure is not limited thereto.

In addition, as an electrolyte salt, the lithium salt is an ionizable lithium salt and may be represented by $Li^+X^-$. The anion (X) of lithium salt is not particularly limited and particular examples thereof include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

Meanwhile, according to an embodiment of the present disclosure, the polymeric electrolyte material may further include an additional polymer gel electrolyte. The polymer gel electrolyte has high ion conductivity ($10^{-6}$ S/m or more, preferably $10^{-5}$ S/m or more) and has binding property so that it may provide not only a function as an electrolyte but also a function as an electrode binder resin imparting binding force in electrode active material particles and between an electrode layer and a current collector.

According to an embodiment of the present disclosure, the solid electrolyte membrane may include a crosslinking agent and/or initiator. The crosslinking agent and initiator may initiate reaction by heat or light.

According to an embodiment of the present disclosure, the thickness of the solid electrolyte membrane may be controlled suitably within a range of 5-500 μm. Within the above-defined range, the solid electrolyte membrane may have a thickness of 10 μm or more, 30 μm or more, 50 μm or more, 100 μm or more, 200 μm or more, or 300 μm or more. Meanwhile, the solid electrolyte membrane may have a thickness of 450 μm or less, 400 μm or less, 300 μm or less, 200 μm or less, 100 μm or less, or 50 μm or less. For example, the solid electrolyte membrane may have a thickness of 10-100 μm, or 30-50 μm.

According to an embodiment of the present disclosure, the polymeric electrolyte material may be present in an amount of 10-95 vol % based on 100 vol % of the solid electrolyte membrane. When the content of the polymeric electrolyte material is less than 10 vol %, the solid electrolyte membrane has excessively high porosity due to such a low content to cause a decrease in ion conductivity and to make it difficult to allow free standing of particle-type materials. On the other hand, when the content of the polymeric electrolyte material is larger than 95 vol %, the content of filler particles becomes excessively low, resulting in degradation of the effect of controlling the direction of lithium dendrite growth derived from the filler particles.

(2) Dendrite Growth-Inhibiting Material

The solid electrolyte membrane according to the present disclosure includes a lithium dendrite growth-inhibiting material in the electrolyte membrane. Herein, the term 'dendrite growth-inhibiting material' may be referred to as 'inhibiting material' in brief.

According to the present disclosure, the inhibiting material has lower ionization tendency as compared to lithium. Since the inhibiting material has lower reactivity as compared to lithium, it has lower ionization tendency. For this, lithium ions are prevented from reduction and deposition of lithium metal by the inhibiting material. In addition, deposited lithium is oxidized back to lithium ions to provide an effect of reducing dendrite.

According to the present disclosure, the inhibiting material is derived from at least one of b1) metal(s) having lower ionization tendency lower as compared to lithium, and b2) alloy(s) of two or more of metal(s) having lower ionization tendency lower as compared to lithium, and is a mixture containing at least one of a salt thereof and ion thereof, wherein the mixture is distributed in the solid electrolyte layer. In other words, the solid electrolyte membrane includes at least one of salts of the metals, salts of the alloys, ions of the metals and ions of the alloys. According to an embodiment of the present disclosure, the metal b1) may be at least one selected from the group consisting of K, Sr, Ca, Na, Mg, Be, Al, Mn, Zn, Cr (+3), Fe, Cd, Co, Ni, Sn, Pb, Cu, Hg, Ag, Pd, Ir, Pt (+2), Au and Pt (+4). In addition, the alloy b2) is formed by alloying of two or more metals selected from the metal ingredients. According to an embodiment of the present disclosure, the metal salt may be at least one of chloride, iodide, cyanide, bromide, sulfide, hydroxide, phosphite and chloride hydrate. However, the scope of the present disclosure is not limited thereto, as long as the metal salt can react with lithium metal to oxidize lithium metal into ionic forms. Meanwhile, according to an embodiment of the present disclosure, an inhibiting material having lower ionization tendency provides a higher effect of inhibiting growth of lithium dendrite. Thus, the inhibiting material may include at least one of Au and Pt. According to an embodiment of the present disclosure, when Au is used as an inhibiting material, a salt thereof, $HAuCl_4 \cdot 3H_2O$, may be introduced when forming the solid electrolyte layer.

In addition, according to an embodiment of the present disclosure, the inhibiting material may be dispersed in the electrolyte membrane with uniform distribution.

According to an embodiment of the present disclosure, the content of the inhibiting material may be 0.1-90 wt % based on 100 wt % of the solid electrolyte membrane. Within the above-defined range, the content of the inhibiting material may be 1 wt % or more, 10 wt % or more, 30 wt % or more, 50 wt % or more, 60 wt % or more, or 70 wt % or more. In addition, within the above-defined range, the content of the inhibiting material may be 80 wt % or less, 70 wt % or less, 60 wt % or less, 50 wt % or less, 40 wt % or less, 30 wt % or less, 20 wt % or less, or 10 wt % or less.

(3) Filler Particles

As described above, the solid electrolyte membrane according to the present invention includes a mixed phase in which the polymeric electrolyte material is mixed with filler particles, wherein the dendrite growth-inhibiting material is dispersed in the polymeric electrolyte material. According to the present disclosure, the filler particles may include organic particles and/or inorganic particles.

According to the present disclosure, the filler particles function to guide the direction of dendrite growth in the solid electrolyte membrane to the site where the polymeric electrolyte material is distributed. In other words, when dendrite grows on the negative electrode surface, the filler particles have higher hardness and/or strength as compared to the polymeric electrolyte material, and thus lithium dendrite is grown along the direction in which the polymeric electrolyte material having lower strength as compared to the filler particles is disposed, instead of the direction in which the filler particles are disposed. In addition, since the polymeric electrolyte material includes the lithium dendrite growth-inhibiting material, lithium dendrite is in contact with the inhibiting material and is ionized again. In other words, it is possible to increase the contact frequency between lithium dendrite and the inhibiting material in the electrolyte material by disposing the filler particles in the solid electrolyte membrane, and thus to maximize the inhibiting effect of the inhibiting material.

According to the present disclosure, the filler particles may be inorganic particles. There is no particular limitation in the inorganic particles, as long as they cause no oxidation and/or reduction in the range (e.g. 0-5V based on $Li/Li^+$) of operating voltage of an applicable electrochemical device. According to an embodiment of the present disclosure, the inorganic particles may include metal oxide particles. Independently from or in combination with the metal oxide particles, the inorganic particles may include high-dielectric constant inorganic particles. Such high-dielectric constant inorganic particles may contribute to an increase in dissociation degree of an electrolyte salt, such as a lithium salt, in the electrolyte, thereby improving ion conductivity. With a view to improvement of ion conductivity, the inorganic particles may be inorganic particles having a dielectric constant of 5 or more. Non-limiting examples of the inorganic particles having a dielectric constant of 5 or more include $BaTiO_3$, $Pb(Zr,Ti)O_3$ (PZT), $Pb_{1-x}La_xZr_{1-y}Ti_yO_3$ (PLZT, wherein 0<x<1, 0<y<1), $Pb(Mg_{1/3}Nb_{2/3})O_3PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or a mixture thereof.

Meanwhile, the inorganic particles may be inorganic particles having lithium ion transportability, i.e. inorganic particles containing lithium element, not storing lithium but transporting lithium ions. Such inorganic particles having lithium ion transportability may include oxide-based solid electrolyte materials. Non-limiting examples of such inorganic particles include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), (LiAlTiP)$_xO_y$-type glass (0<x<4, 0<y<13) such as $14Li_2O-9Al_2O_3-38TiO_2-39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), such as such as $Li_{3.25}Ge_{0.25}P_{0.75}S_4$, lithium nitride ($Li_xN_y$, 0<x<4, 0<y<2), such as $Li_3N$, $SiS_2$-type glass ($Li_xSi_yS_z$, 0<x<3, 0<y<2, 0<z<4), such as $Li_3PO_4$—$Li_2S$—$SiS_2$, $P_2S_5$-type glass ($Li_xP_yS_z$, 0<x<3, 0<y<3, 0<z<7), such as LiI—$Li_2S$—$P_2S_5$, and mixtures thereof.

According to the present disclosure, the inorganic particles may have a diameter of 10 nm to 50 μm.

Meanwhile, according to an embodiment of the present disclosure, the filler particles may include organic particles. Particular examples of the organic particles include, but are not limited to: styrene-butadiene rubber (SBR), polybutadiene rubber, polychloroprene (neoprene), nitrile rubber, acryl rubber, fluoro-rubber (FKM), polyvinyl chloride (PVC), polystyrene, polymethyl methacrylate (PMMA), acrylonitrile-butadiene-styrene (ABS), polyvinylidene fluoride, polyvinyl fluoride, PTFE, polyvinyl acetate, polyvinyl acetate-containing copolymers, polyvinyl acetate-co-ethylene, or the like. When using organic particles as filler particles, there is an advantage in that the particle diameter may be controlled by adjusting polymerization conditions and the organic particles may be prepared with various particle diameter ranges depending on laboratory conditions.

Meanwhile, according to the present disclosure, the content of the filler particles may be 5-90 vol %, preferably 30-70 vol %, based on 100 vol % of the solid electrolyte membrane.

The filler particles may not be amorphous, like fluid, but may have a regular shape, such as spherical, hexahedral or octahedral shape, or an irregular shape.

As mentioned above, since the electrolyte membrane according to the present disclosure includes an inhibiting material capable of inhibiting lithium growth and filler particles capable of guiding the direction of lithium growth, it is possible to effectively inhibit a short-circuit caused by lithium dendrite growth when it is applied to an all-solid-state battery including lithium metal as a negative electrode active material.

FIG. 2 is a schematic view illustrating the effect of inhibiting lithium dendrite growth through the filler particles and inhibiting material in the solid electrolyte membrane. Referring to FIG. 2, since the solid electrolyte membrane 13 according to an embodiment of the present disclosure includes a polymeric electrolyte material 13a, filler particles 13c and an inhibiting material 13b, lithium dendrite 14a at the negative electrode 14 is guided in such a manner that it may be grown through an ion transport channel (A, represented by the dotted line) formed by the spaces among the filler particles 13c. Therefore, it is possible to provide an effect of inhibiting vertical development of dendrite. In addition, it is possible to provide an effect of inhibiting dendrite growth by the inhibiting material contained in the solid electrolyte membrane. In FIG. 2, the ion transport channel A simply represents a channel through which lithium ions are transported.

(4) Method for Manufacturing Solid Electrolyte Membrane

Hereinafter, the method for manufacturing the above-described solid electrolyte membrane will be explained. The following method is one of the methods that may be applied to obtain the solid electrolyte membrane according to the present disclosure and the scope of the present disclosure is not limited thereto.

The solid electrolyte membrane may be obtained by introducing a metal salt as an inhibiting material and filler particles to a solid electrolyte solution, prepared by introducing a polymer resin and a lithium salt to a solvent, to prepare slurry for forming a solid electrolyte membrane, and forming the slurry into a film shape. The polymer resin may include an ion conductive polymer material. In addition, the solid electrolyte solution may further include an initiator and/or curing agent in order to increase the durability and physical strength of the solid electrolyte membrane.

According to an embodiment of the present disclosure, the solid electrolyte membrane may be obtained as follows. A polymer resin, such as PEO, is dissolved into acetonitrile (AN) as a solvent to form a polymer solution and a lithium salt is added thereto. Herein, the ratio of the polymeric electrolyte to the lithium salt in the polymer solution may be [EO]/[Li$^+$]=10-50/1 (molar ratio). It is possible to carry out agitation and/or heating for several hours to several tens of hours so that the polymer material and lithium salt may be dissolved sufficiently in the resultant polymer solution. Then, the inhibiting material and filler particles are added to the polymer solution to prepare slurry.

The inhibiting material may be prepared in the form of a metal salt and about 1-10 parts by weight of the inhibiting material is added based on 100 parts by weight of the polymer material, followed by homogeneous mixing. After that, the slurry is applied to a release sheet, dried and removed from the release sheet to obtain a sheet-like solid electrolyte membrane. Meanwhile, according to an embodiment of the present disclosure, an initiator and/or curing agent may be further introduced to the polymer solution. Herein, the curing agent and initiator are added to the polymer solution, preferably in the form of a solution prepared by introducing them to a desired solvent, in order to increase dispersibility.

(5) all-solid-state Battery

In another aspect, there is provided an all-solid-state battery including the solid electrolyte membrane. According to an embodiment of the present disclosure, the all-solid-state battery includes a negative electrode, a positive electrode and a solid electrolyte membrane interposed between the negative electrode and the positive electrode, wherein the solid electrolyte membrane has the above-mentioned characteristics.

According to the present disclosure, the negative electrode may include a current collector and a negative electrode active material layer formed on the surface of the current collector, wherein the negative electrode active material layer may include at least one element that belongs to alkali metals, alkaline earth metals, Group 3B metals and transition metals. According to an embodiment of the present disclosure, non-limiting examples of alkali metals include at least one metal selected from the group consisting of lithium (Li), sodium (Na), potassium (K), rubidium (Rb), cesium (Cs) and francium (Fr), preferably lithium. According to an embodiment of the present disclosure, the negative electrode may be formed by binding and stacking the negative electrode current collector with lithium metal foil having a predetermined thickness through compression.

According to the present disclosure, the positive electrode includes a current collector and a positive electrode active material layer formed on at least one surface of the current collector. The positive electrode active material layer includes a positive electrode active material, a solid electrolyte and a conductive material. According to an embodiment of the present disclosure, the positive electrode active material layer may further include a binder material. It is possible to increase the binding force of the positive electrode active material layer with the current collector and/or the solid electrolyte membrane by introducing the binder material. Independently from this or in addition to this, introduction of the binder material assists improvement of the binding force of the ingredients contained in the positive electrode active material.

The positive electrode active material may be any material used conventionally as a positive electrode active material for a lithium ion secondary battery. Non-limiting examples of the positive electrode active material may include, but are not limited to: layered compounds such as lithium cobalt oxide (LiCoO$_2$) and lithium nickel oxide (LiNiO$_2$), or those compounds substituted with one or more transition metals; lithium manganese oxides such as those represented by the chemical formula of Li$_{1+x}$Mn$_{2-x}$O$_4$ (wherein x is 0-0.33), LiMnO$_3$, LiMn$_2$O$_3$ and LiMnO$_2$; lithium copper oxide (Li$_2$CuO$_2$); vanadium oxides such as LiV$_3$O$_8$, LiV$_3$O$_4$, V$_2$O$_5$ or Cu$_2$V$_2$O$_7$; lithium nickel oxides represented by the chemical formula of LiNi$_{1-x}$M$_x$O$_2$ (wherein M is Co, Mn, Al, Cu, Fe, Mg, B or Ga, and x is 0.01-0.3), such as LiNi$_{0.8}$Co$_{0.1}$M$_{0.1}$O$_2$; lithium manganese composite oxides represented by the chemical formula of LiMn$_{2-x}$M$_x$O$_2$ (wherein M=Co, Ni, Fe, Cr, Zn or Ta, and x=0.01-0.1) or Li$_2$Mn$_3$MO$_8$ (wherein M=Fe, Co, Ni, Cu or Zn); lithium manganese composite oxides having a spinel structure and represented by the formula of LiNi$_x$Mn$_{2-x}$O$_4$; LiMn$_2$O$_4$ in which Li is partially substituted with an alkaline earth metal ion; disulfide compounds; Fe$_2$(MoO$_4$)$_3$; or the like.

The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, Ketjen black, channel black, furnace black, lamp black or thermal black; conductive fibers, such as carbon fibers (e.g. vapor grown carbon fibers (VGCF)) or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

The binder material is not particularly limited, as long as it is an ingredient which assists binding between the active material and the conductive material and binding to the current collector. Particular examples of the binder material include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like. In general, the binder resin is added in an amount of 1-30 wt %, or 1-10 wt %, based on 100 wt % of the electrode layer.

According to an embodiment of the present disclosure, the negative electrode and/or the positive electrode may further include various additives in order to supplement or improve the physicochemical properties thereof. Although there is no particular limitation, the additives may include at least one of an oxidation-stabilizing agent, reduction-stabilizing agent, flame retardant, heat stabilizer, anti-fogging agent, or the like.

In addition, the current collector is generally formed to have a thickness of 3-500 μm. The current collector is not particularly limited, as long as it causes no chemical change in the corresponding battery and has high conductivity. For example, the current collector may include copper, stainless steel, aluminum, nickel, titanium, baked carbon, or aluminum or stainless steel surface-treated with carbon, nickel, titanium, silver, or the like. Any suitable current collector may be used depending on polarity of the electrode (positive or negative electrode).

In still another aspect, there are provided a battery module including the secondary battery as a unit cell, a battery pack including the battery module, and a device including the battery pack as a power source.

Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

Example 1

(1) Manufacture of Solid Electrolyte Membrane

Polyethylene oxide (PEO, Mw=1,000,000 g/mol) was dissolved in acetonitrile (AN) as a solvent to prepare a 10 wt % polymer solution. Herein, LiTFSI as a lithium salt was introduced together so that the molar ratio of [EO]/[Li+] might be 9/1. The polymer solution was agitated overnight at 60° C. to dissolve PEO and the lithium salt sufficiently therein. Next, alumina particles (Sigma-Aldrich, particle diameter 10 μm) were added in an amount of 10 vol % and the resultant solution was further agitated overnight. Then, $HAuCl_4 \cdot 3H_2O$ was added in an amount of 1 wt % based on the amount of Li salt, the resultant solution was agitated for 6 hours, and an additive solution containing an initiator and a curing agent was prepared. The curing agent was PEGDA (Mw=575) and the initiator was benzoyl peroxide (BPO), wherein polyethylene glycol diacrylate (PEGDA) was used in an amount of 20 wt % based on PEO and BPO was used in an amount of 1 wt % based on PEGDA. Acetonitrile was used as a solvent. The additive solution was agitated for about 1 hour so that the introduced ingredients might be mixed thoroughly. Then, the additive solution was added to the polymer solution and the two solutions were mixed sufficiently with each other. The resultant mixed solution was applied to and coated on a release film by using a doctor blade. The release film coated with the solution was transferred to a glass plate and the glass plate was balanced and dried at room temperature overnight, followed by vacuum drying at 100° C. for 12 hours. In this manner, the first solid electrolyte layer was obtained. The first solid electrolyte layer had a thickness of about 50 μm.

(2) Manufacture of Positive Electrode

To obtain slurry, NCM811 ($LiNi_{0.8}Co_{0.1}Mn_{0.1}O_2$) as an electrode active material, VGCF (vapor grown carbon fiber) as a conductive material and a polymeric solid electrolyte (mixture of PEO with LiTFSI, [EO]/[Li+]=9/1 molar ratio) were mixed at a weight ratio of 80:3:17 and introduced to acetonitrile, followed by agitation, to obtain electrode slurry. An aluminum current collector having a thickness of 20 μm was prepared. The slurry was applied to the current collector by using a doctor blade and the resultant structure was vacuum dried at 120° C. for 4 hours. Next, pressing was carried out by using a roll press to obtain an electrode having an electrode loading of 2 $mAh/cm^2$, an electrode layer thickness of 48 μm and a porosity of 22 vol %.

(3) Manufacture of Battery

The electrode obtained from (2) was cut into a circular shape having an area of 1.4875 $cm^2$. Lithium metal foil cut into a circular shape having an area of 1.7671 $cm^2$ was prepared as a counter electrode. The solid electrolyte membranes obtained from (1) was interposed between the two electrodes to obtain a coin type half-cell.

Example 2

A solid electrolyte membrane was obtained in the same manner as Example 1, except that $HAuCl_4$ was used at a concentration of 5 wt %.

Example 3

A solid electrolyte membrane was obtained in the same manner as Example 1, except that $HAuCl_4$ was used at a concentration of 20 wt %.

Example 4

A solid electrolyte membrane was obtained in the same manner as Example 1, except that the content of alumina particles was 50 vol % and $HAuCl_4$ was used at a concentration of 5 wt %.

Example 5

A solid electrolyte membrane was obtained in the same manner as Example 1, except that LAGP ($Li_{1.5}Al_{0.5}Ge_{1.5}P_3O_{12}$, available from MTI, 500 nm) was used in an amount of 80 vol % instead of alumina particles and $HAuCl_4$ was used at a concentration of 5 wt %.

Example 6

A solid electrolyte membrane was obtained in the same manner as Example 1, except that PMMA beads ($D_{50}$ 5 μm)

were used in an amount of 10 vol % instead of alumina particles and HAuCl$_4$ was used at a concentration of 5 wt %.

Comparative Example 1

A solid electrolyte membrane was obtained in the same manner as Example 1, except that alumina particles and the inhibiting material were not used.

Comparative Example 2

A solid electrolyte membrane was obtained in the same manner as Example 1, except that alumina particles were not used and HAuCl$_4$ was used at a concentration of 60 wt %.

Comparative Example 3

A solid electrolyte membrane was obtained in the same manner as Example 1, except that alumina particles were introduced in an amount of 10 vol % and the inhibiting material was not introduced.

Comparative Example 4

A solid electrolyte membrane was obtained in the same manner as Example 1, except that alumina particles were introduced in an amount of 93 vol % and HAuCl$_4$ was used at a concentration of 60 wt %.

Test Examples (1) Determination of Ion Resistance

Each of the solid electrolyte membranes obtained from Examples and Comparative Examples was cut into a size of 1.7671 cm$^2$. The solid electrolyte membrane was interposed between two sheets of stainless steel (SUS) to obtain a coin cell. An analyzer (VMP3, Biologic science instrument) was used to measure electrochemical impedance at 60° C. under the conditions of an amplitude of 10 mV and a scan range of 500 kHz to 200 MHz.

(2) Evaluation of Discharge Capacity and Short Generation Point

Each of the batteries according to Examples and Comparative Examples was charged/discharged at about 60° C. and the initial discharge capacity was evaluated.

Charge condition: constant current (CC)/constant voltage (CV) (4.15V, 0.05C, 0.005C current cut-off)

Discharge condition: CC condition, 3V (0.05C)

Meanwhile, a point where a short-circuit occurs was judged as an abnormal behavior (unstable change in voltage) point of voltage during charge, when evaluating life characteristics by carrying out charge/discharge at 0.1C.

The evaluation results are shown in the following Table 1.

TABLE 1

|  | Ion conductivity (S/cm, 60° C.) | Discharge capacity (mAh/g, 4.15 V) | Short generation point (cycle No.) |
| --- | --- | --- | --- |
| Example 1 | 2E-04 (2 × 10$^{-4}$) | 160 | 15 |
| Example 2 | 1E-04 (1 × 10$^{-4}$) | 157 | 23 |
| Example 3 | 8E-05 (8 × 10$^{-5}$) | 152 | 28 |
| Example 4 | 4E-05 (4 × 10$^{-5}$) | 142 | 28 |
| Example 5 | 9E-05 (9 × 10$^{-5}$) | 155 | 31 |
| Example 6 | 1E-04 (1 × 10$^{-4}$) | 155 | 18 |
| Comparative Example 1 | 1E-04 (1 × 10$^{-4}$) | 158 | 5 |

TABLE 1-continued

|  | Ion conductivity (S/cm, 60° C.) | Discharge capacity (mAh/g, 4.15 V) | Short generation point (cycle No.) |
| --- | --- | --- | --- |
| Comparative Example 2 | 7E-06(7 × 10$^{-6}$) | — | — |
| Comparative Example 3 | 2E-04(2 × 10$^{-4}$) | 161 | 9 |
| Comparative Example 4 | 5E-07(5 × 10$^{-7}$) | — | — |

As can be seen from Table 1, in the case of Comparative Examples 1 and 3, incorporation of filler particles to the solid electrolyte layer causes slight improvement of life characteristics. This is because addition of filler particles increases the strength and ion conductivity of the solid electrolyte. However, there is no significant effect of delaying a short generation point. On the contrary, in the case of Examples including both the inhibiting material and filler particles, there is a significant effect of delaying a short generation point. In addition, it can be seen that when using filler particles in combination with the inhibiting material, even a small amount of the inhibiting material significantly delays a short generation point. Meanwhile, it can be seen that not only general oxide-based inorganic particles but also organic particles or oxide-based solid electrolytes provide the above-mentioned effect as filler particles. This is because Li dendrite is grown along the solid electrolyte among the particles and then Li is ionized again through galvanic reaction upon the contact with the inhibiting material to cause a delay in short generation point.

DESCRIPTION OF DRAWING NUMERALS

10: all-solid-state battery
11: Current collector
12: Positive electrode
13: Solid electrolyte membrane
14: Negative electrode (lithium metal)
14a: Dendrite
13a: Polymeric electrolyte material
13c: Filler particles
13b: Inhibiting material
A: Lithium ion transport channel

What is claimed is:

1. A solid electrolyte membrane for an all-solid-state battery which is interposed between a negative electrode and a positive electrode, the solid electrolyte membrane comprising a) a polymeric electrolyte material having ion conductivity, b) a dendrite growth-inhibiting material, and c) a plurality of filler particles, wherein the dendrite growth-inhibiting material comprises a metal salt and is mixed with the polymeric electrolyte material, and the metal salt has lower reactivity as compared to lithium metal, and wherein the filler particles are chemically and physically stable against electrochemical reaction and include organic particles and/or inorganic particles,
wherein the metal salt comprises at least one of phosphite or chloride hydrate of Pt(+2), Au or Pt(+4).

2. The solid electrolyte membrane according to claim 1, wherein the polymeric electrolyte material is present in an amount of 10-95 wt % based on 100 wt % of the solid electrolyte membrane.

3. The solid electrolyte membrane according to claim 1, wherein the polymeric electrolyte material is an ion conductive composite of a polymer resin with a lithium salt and has an ion conductivity of 1×10$^{-6}$ S/m or more.

4. The solid electrolyte membrane according to claim 1, wherein the inorganic particles comprise at least one of a metal oxide or an oxide-based solid electrolyte.

5. The solid electrolyte membrane according to claim 1, wherein the inorganic particles have a particle diameter of 10 nm to 50 μm.

6. The solid electrolyte membrane according to claim 4, wherein the metal oxide comprises at least one of $BaTiO_3$, $Pb(Zr, Ti)O_3$ (PZT), $Pb_{1-x}La_xZr_{1-y}Ti_yO_3$ (PLZT, wherein $0<x<1$, $0<y<1$), $Pb(Mg_{1/3}Nb_{2/3})O_3$—$PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ or SiC.

7. The solid electrolyte membrane according to claim 4, wherein the oxide-based solid electrolyte comprises lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-type glass ($Li_xSi_yS_z$, $0<x<3$, $0<y<2$, $0<z<4$), $P_2S_5$-type glass ($Li_xP_yS_z$, $0<x<3$, $0<y<3$, $0<z<7$), or mixtures thereof.

8. The solid electrolyte membrane according to claim 1, wherein the organic particles comprise at least one of styrene-butadiene rubber (SBR), polybutadiene rubber, polychloroprene (neoprene), nitrile rubber, acryl rubber, fluoro-rubber (FKM), polyvinyl chloride (PVC), polystyrene, polymethyl methacrylate (PMMA), acrylonitrile-butadiene-styrene (ABS), polyvinylidene fluoride, polyvinyl fluoride, PTFE, polyvinyl acetate, polyvinyl acetate-containing copolymers or polyvinyl acetate-co-ethylene.

9. An all-solid-state battery comprising a negative electrode, the solid electrolyte membrane of claim 1, and a positive electrode stacked successively, wherein the negative electrode comprises lithium metal as a negative electrode active material.

10. The solid electrolyte membrane according to claim 3, wherein the polymer resin is at least one of a polyether polymer, polycarbonate polymer, acrylate polymer, polysiloxane polymer, phosphazene polymer, polyethylene derivatives, alkylene oxide derivatives, phosphate polymer, polyagitation lysine, polyester sulfide, polyvinyl alcohol, polyvinylidene fluoride or a polymer containing an ionically dissociable group.

11. The solid electrolyte membrane according to claim 3, wherein the lithium salt is represented by $Li^+X^-$, and the anion (X) is $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, or $(CF_3CF_2SO_2)_2N^-$.

12. The solid electrolyte membrane according to claim 3, wherein the polymeric electrolyte material further includes a polymer gel electrolyte having an ion conductivity of $10^{-6}$ S/m or more.

13. The solid electrolyte membrane according to claim 1, further comprising a crosslinking agent and/or initiator.

14. The solid electrolyte membrane according to claim 1, having a thickness in a range of 5-500 μm.

15. The solid electrolyte membrane according to claim 1, wherein the dendrite growth-inhibiting material is dispersed in the electrolyte membrane with uniform distribution.

16. The solid electrolyte membrane according to claim 1, wherein the dendrite growth-inhibiting material is in an amount of 0.1-90 wt % based on 100 wt % of the solid electrolyte membrane.

17. The solid electrolyte membrane according to claim 1, wherein the filler particles are in an amount of 5-90 vol % based on 100 vol % of the solid electrolyte membrane.

* * * * *